(12) United States Patent
Uyeda (10) Patent No.: US 11,827,431 B2
(45) Date of Patent: Nov. 28, 2023

(54) PACKAGING WITH SIMULTANEOUSLY FOLDABLE BASE AND TRAY

(71) Applicant: Apple Inc., Cupertino, CA (US)

(72) Inventor: Mark T. Uyeda, Campbell, CA (US)

(73) Assignee: Apple Inc., Cupertino, CA (US)

( * ) Notice: Subject to any disclaimer, the term of this patent is extended or adjusted under 35 U.S.C. 154(b) by 373 days.

(21) Appl. No.: 17/160,499

(22) Filed: Jan. 28, 2021

(65) Prior Publication Data

US 2022/0234782 A1 Jul. 28, 2022

(51) Int. Cl.
*B65D 5/50* (2006.01)
*B65D 5/42* (2006.01)
*B65D 77/04* (2006.01)
*B65D 5/32* (2006.01)

(52) U.S. Cl.
CPC ........... *B65D 5/5038* (2013.01); *B65D 5/321* (2013.01); *B65D 5/4266* (2013.01); *B65D 77/042* (2013.01); *B65D 2577/041* (2013.01)

(58) Field of Classification Search
CPC .... B65D 5/5038; B65D 5/321; B65D 5/4266; B65D 77/042; B65D 5/36; B65D 2577/041
USPC .......................................................... 206/485
See application file for complete search history.

(56) References Cited

U.S. PATENT DOCUMENTS

| | | | | |
|---|---|---|---|---|
| 3,899,119 A | * | 8/1975 | Roccaforte | B65D 5/5021 229/164 |
| 4,444,314 A | * | 4/1984 | Jacobsson | B42F 17/08 206/311 |
| 4,606,460 A | * | 8/1986 | Luray | B65D 81/07 206/583 |
| 5,299,711 A | * | 4/1994 | Romick | A61J 1/03 206/534 |
| 5,788,081 A | * | 8/1998 | Bates | A47G 23/06 206/562 |
| 5,803,267 A | * | 9/1998 | Tu | B65D 5/5021 206/723 |
| 5,823,352 A | * | 10/1998 | Mena | B65D 5/4204 206/721 |
| 7,056,122 B2 | * | 6/2006 | Lockett | G09B 1/00 40/352 |
| 7,293,695 B2 | * | 11/2007 | Stier | B65D 5/4802 229/160 |
| 8,627,958 B2 | * | 1/2014 | McDonald | B65D 5/503 206/583 |
| 8,919,018 B2 | * | 12/2014 | Udovic | G09F 1/04 40/124.06 |
| 8,978,882 B2 | * | 3/2015 | Glass | B65D 85/00 206/39.6 |

(Continued)

FOREIGN PATENT DOCUMENTS

CN 211281820 U 8/2020

*Primary Examiner* — Ernesto A Grano
(74) *Attorney, Agent, or Firm* — Sterne, Kessler, Goldstein & Fox P.L.L.C.

(57) ABSTRACT

Packaging may include a base box comprising cardboard, e.g., cardboard corrugate. Disposed within the base box may be a tray for receiving a product, which also may comprise cardboard. By constructing a base box and tray that both fold flat without destructive means, this type of configuration retains a high-end reception of the end product and product packaging, while encouraging proper recycling once the customer decides to dispose of the packaging.

18 Claims, 11 Drawing Sheets

(56) References Cited

U.S. PATENT DOCUMENTS

| | | | |
|---|---|---|---|
| 9,981,771 B2 | 5/2018 | Noskin et al. | |
| 10,301,046 B2* | 5/2019 | Mundt | B65D 5/6676 |
| 10,392,156 B2 | 8/2019 | McDonald et al. | |
| 2005/0218202 A1* | 10/2005 | Braoudakis | B65D 25/205 |
| | | | 206/459.5 |
| 2012/0043323 A1* | 2/2012 | Thomas | B65D 5/38 |
| | | | 220/254.1 |
| 2012/0125807 A1* | 5/2012 | Jones | B65D 77/042 |
| | | | 206/583 |
| 2013/0048533 A1* | 2/2013 | McDonald | B65D 5/5021 |
| | | | 206/591 |
| 2013/0126371 A1* | 5/2013 | Glass | B65D 73/0078 |
| | | | 206/232 |
| 2014/0027500 A1* | 1/2014 | Thorn | B65D 5/4233 |
| | | | 53/461 |
| 2015/0239635 A1* | 8/2015 | McDonald | B65D 5/5028 |
| | | | 206/583 |
| 2015/0266639 A1* | 9/2015 | McDonald | B65D 81/07 |
| | | | 493/392 |
| 2015/0314936 A1* | 11/2015 | Stack, Jr. | B65D 75/14 |
| | | | 206/488 |
| 2016/0167857 A1 | 6/2016 | Liu | |
| 2018/0164621 A1* | 6/2018 | Fukai | G09F 9/00 |
| 2018/0265254 A1* | 9/2018 | Smith | B65D 21/0213 |

\* cited by examiner

PACKAGING WITH SIMULTANEOUSLY FOLDABLE BASE AND TRAY

FIELD

The described embodiments relate generally to packaging. More particularly, the present embodiments relate to packaging having foldable components including a foldable base and tray that may simultaneously be collapsed and flattened for recycling.

BACKGROUND

The described embodiments relate generally to packaging. More particularly, the present embodiments relate to packaging using folded recyclable components including a simultaneously foldable base and tray for easier recycling. Product packaging is an integral part of a customer's experience. It introduces the customer to their product, and can affect the customer's feelings toward the product and the company that created it. This is especially true for companies that wish to move toward a single stream recycling solution for their packaging. In general, some current higher end packaging (e.g., for electronic devices) may include plastic materials. While these materials and packaging designs provide adequate coverage, they are not environmentally friendly and use nonrenewable resources for their raw material.

In contrast, some more environmentally friendly materials such as molded fiber based trays that are integrated in a lower base box may be structurally configured such that no deformation of the packaging is easily achievable without damaging the packaging such that it may not be intuitive to a customer to recycle the packaging.

What is needed is a recyclable packaging paradigm that can maintain packaging integrity prior to being received by an end user, but easily and intuitively fold and collapse each of its components such that they are easily recyclable.

SUMMARY

Packaging may include a base box including: a base panel and four side panels, each extending vertically from the base panel. Each may be foldable outward from the base panel. The packaging may include a foldable tray received in the base box, and folding one of the side panels outward causes the foldable tray to lower toward the base panel of the base box. In some embodiments, the base box includes foldable wings to couple adjacent ends of the four side panels, respectively. Each wing is foldably attached to one of a pair of adjacent ends of the four side panels and is received within a pocket of the other of the pair of adjacent ends of the four side panels.

The packaging includes a lid in some embodiments. The lid may include four lid side panels, each extending vertically from a lid top panel, and each foldable outward from the lid top panel. In some embodiments, the lid includes foldable wings to couple adjacent ends of the four lid side panels, respectively, and each wing may be foldably attached to one of a pair of adjacent ends of the four lid side panels and is received within a pocket of the other of the pair of adjacent ends of the four lid side panels. In some embodiments, when the lid is coupled to the base, the pockets of the base are perpendicular to the pockets of the lid.

In some embodiments, each of the base box and the foldable tray is formed from cardboard.

In some embodiments, the base box is configured to fold flat outwardly in a first direction, and the foldable tray is configured to fold flat outwardly in a second direction, wherein the first direction is perpendicular to the first direction.

Some embodiments are directed to packaging that includes a base box transitionable between an assembled state and a flattened state. The base box may include a base panel and four side panels, each extending vertically from the base panel at respective folds when the box is in an assembled state. Each side panel may be foldable outward from the base panel to configure the base box to a flattened state.

The packaging may include a tray configured to be received in the base box and transitionable between an assembled state and a flattened state. In some embodiments, the tray includes a tray cover and a tray support disposed beneath the tray cover and slidably connected to the tray cover. In some embodiments, the tray support structurally supports the tray cover in an assembled state and positions the tray cover above the base panel. The tray support is foldable to a flattened state when the base box is in a flattened state. The tray support may include first and second side panels configured to be fixed to an inner periphery of the base box, and include first and second upper support panels extending from the first and second side panels, respectively, and providing a product support area when the packaging is in an assembled state. As an inner periphery of the base box folds outwardly to a flattened state the first and second side panels allow the first and second upper support panels to lower towards the base panel of the base box, thereby flattening the tray.

In some embodiments, the tray cover is fixed to the first upper support panel, such that as the first upper support panel lowers towards the base panel of the base box, the tray cover also lowers towards the base panel of the base box. The tray cover extends from a first of the four side panels to a second of the side panels opposite the first side panel when in an assembled state. In some embodiments, the tray cover is translationally coupled to the second upper support panel, such that as the second upper support panel lowers towards the base panel of the base box, the tray cover also lowers towards the base panel of the base box and translates along the upper surface of the second upper support panel. The base box, tray cover, and tray support are made from cardboard in some embodiments.

The second upper support panel may include a slot to receive a guide, and the guide may be fixed to the lower surface of the tray cover. As the second upper support panel moves when folding the tray flat, the guide is free to translate within the slot, thereby also translating the tray cover along the slot. The base box may further include wing guides. In some embodiments, the base box further includes a lower box cover folded around the base panel and side panels, the lower box cover including wings to be received in a pocket between a portion of the lower box cover and a side panel of the base box, guided by the wing guides, such that the base box is secured in an assembled state. Each of the wings may include a mechanical lock configured to releasably attach to the base box in some embodiments.

The packaging may include a lid. The lid may include a lid top panel and four side panels, each extending vertically from the lid top panel at respective folds when the lid is in an assembled state, and each foldable outward from the lid top panel to configure the lid to a flattened state. The lid may include a lid cover folded around the lid top panel and side panels, the lid cover including wings to be received in a pocket between a portion of the lid top cover and a side panel of the lid, such that the lid is secured in an assembled state. In some embodiments, the wings of the lid extend into the panels offset 90 degrees from the panels that the wings of the base box extend into, in an assembled state.

In some embodiments, in the assembled configuration a first side panel of the four side panels and a second side panel of the four side panels extend perpendicularly from the base panel and the tray cover is spaced apart from the base panel, and wherein when the first side panel and the second side panel are rotated outwardly about their folds, the tray cover and a portion of the tray support slide relative to each other and lower toward the base panel, to transition the base box into the flattened state.

Some embodiments are directed to a foldable tray for packaging and configured to be coupled within a base box. The foldable tray for packaging may include a tray cover formed of a first cardboard material, and a tray support disposed beneath the tray cover and formed of a second cardboard material different from the first cardboard material. The tray support may include first and second side panels configured to be fixed to an inner periphery of a base box, first and second upper support panels extending from the first and second side panels and towards the center of the tray support, center support panels extending from the opposing ends of the first and second upper support panels towards a bottom surface of an interior of the base box, and a ground panel connecting the center support panels and coupled to the bottom surface of an interior of the base box. In an assembled state the foldable tray supports a product. The first and second side panels allow the first and second upper support panels to lower towards the ground panel, thereby flattening the tray in response to an outward force on the first and second side panels. In some embodiments, the tray cover is fixed to the first upper support panel, and the tray cover is translationally coupled to the second upper support panel.

In some embodiments, in an assembled state the center support panels are angled toward each other relative to the ground panel, such that in a folded state the tray folds flat relative to the base box. The base box includes wings that fold inward and secure the side panels of the base box in the assembled state, and wherein the first side panel of the tray is fixed to an inner surface of a first side panel of the base box, such that as the first side panel of the base box rotates outward to the flattened state, the first side panel of the tray support rotates toward the base panel of the base box, thereby flattening a first side of the tray in some embodiments.

The foldable tray may include a lid. The lid may include a lid top panel, four side panels, each extending vertically from the lid top panel at respective folds when the lid is in an assembled state, and each foldable outward from the lid top panel to configure the lid to a flattened state, and foldable wings. In some embodiments, the wings couple adjacent ends of the four side panels, respectively, and each wing is foldably attached to one of a pair of adjacent ends of the four side panels and is received within a pocket of the other of the pair of adjacent ends of the four side panels. In some embodiments, in an assembled state, the wings secure the lid in a direction opposing the translational direction of the tray cover.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

As described above, the packaging described herein provides a packaging solution utilizing environmentally friendly materials, specifically cardboard (or other cellulose-based material). A base box and tray are disclosed that together, are configured to fold flat once a customer is finished using the packaging, thereby easing recyclability. Elements are described that achieve a structurally sound package, while allowing an end user to easily break-down the package for recycling.

Some embodiments include packaging including a base box comprising cardboard, e.g., paperboard or cardboard corrugate. Disposed within the base box may be a support tray for receiving a product, which also may comprise cardboard. By constructing a base box and support tray that both fold flat without destructive means, this type of configuration retains a high-end reception of the end product and product packaging, while encouraging proper recycling once the customer decides to dispose of the packaging.

In some embodiments, each panel of the base box or tray or both may be formed from a continuous sheet (e.g., a cardboard blank). The respective elements may be formed of the same material or different materials (e.g., different cellulose-based material). For example, the tray may have a cover formed from paperboard, hiding a tray support component made of corrugate. A finished package may include other components such as a lid, which also may fold flat and may be formed similarly to the base box. The lower box may wholly envelop the tray support structure in a finished configuration, such that the tray support structure is not visible to a customer.

Advantageously, this improves upon prior systems having, for example, plastic tray insert components. And in terms of intuitive breakdown and recycling without destroying the packaging, this improves upon prior systems that make use of molded fiber components that are not easily made to lie flat.

Companies may be sensitive to the cost of packaging and may wish to promote packaging that is eco-friendly. Certain packaging materials are higher cost due to their processing, and while engineers may be able to design single-component packaging, the cost may be prohibitive for certain materials. Optimization of packaging in material usage may help keep costs low, and if done well may not interfere with, and may promote, a positive user experience. Packaging made out of recyclable and/or biodegradable materials, such as paper or other cellulose-based products can reduce environmental impact, especially when it is intuitive for a customer to properly recycle. Packaging that is interesting in character and well-executed may boost a product's or a brand's reputation, thereby attracting new customers and retaining previous customers.

In utilizing eco-friendly materials such as cardboard structures, some designs may be less likely to be properly recycled, in part due to the difficulty in breaking down the box/tray components to lie flat and be placed in recycling. Packaging described herein improves on past designs, and provides eco-friendly components that are intuitive to break down and lie flat without requiring destruction (e.g., tearing, ripping, crushing) in order for the packaging to easily be recycled. Packaging described in this document achieves these and other beneficial characteristics by balancing structural robustness, eco-friendly materials, and aesthetic elements.

To keep the product protected and secure during transport, handling, or storage, the base boxes and trays disclosed herein may include recesses or features to hold various components, documents, or products. Each of these recesses or features may include components or designs that allow those recesses or features to also lie flat when the packaging is ready for recycling. A lid may cover the product when the packaging is closed, and may be similarly foldable to lie flat when ready for recycling. A product contained by the packaging may be, for example, an electronic device such as, for example, a desktop, monitor, laptop, tablet computer, or smartphone, or it may be a non-electronic device.

In some embodiments, the packaging may be retail packaging (i.e., finished packaging for containing and conveying a product to a user such as may be used in a retail setting, not shipping packaging for containing a packaged product during shipment) that one may expect to find on the shelf in a retail store, and which one may open after purchase to directly access their product.

These and other embodiments are discussed below with reference to the accompanying figures. However, those skilled in the art will readily appreciate that the detailed description given herein with respect to these figures is for explanatory purposes only and should not be construed as limiting.

Figure 1:
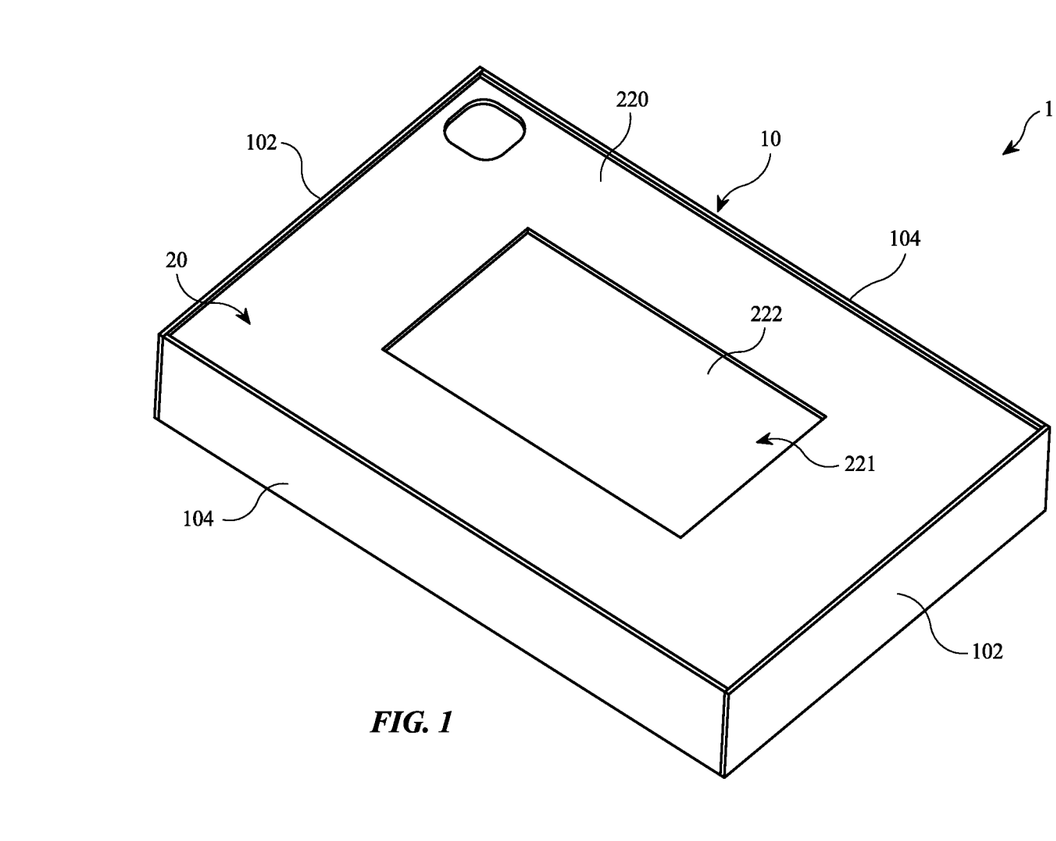
FIG. 1 shows a top isometric view of packaging with tray and base box in an embodiment, in a first, assembled configuration.

FIGS. 1-4 show isometric views of packaging 1 in four different configurations, the first in FIG. 1 being when packaging 1 is assembled and able to receive a product in product area 221, which may optionally include recess 222 to receive a portion of the product or an accessory, such as product documentation, cords, headphones, etc. Each recess 222 may be configured to also fold to a flattened state when the packaging is ready for recycling. In some embodiments, protrusions may be provided, e.g., as part of a tray structure, and those protrusions may also be configured to fold to a flattened state when the packaging is ready for recycling. As shown in the figures, packaging 1 includes a base box 10 that receives tray 20, presenting as an integrated base for packaging 1. Base box 10 includes side panels 102 that extend vertically from bottom panel 100 (e.g., a base panel) in an assembled state. Side panels 104 similarly extend from bottom panel 100, thus forming a base box to receive tray 20. As shown, in total there are generally four side panels, although additional geometries are contemplated. Tray cover 220 is received within the side panels 102 and 104, and covers the additional components of tray 20, presenting as an integrated tray.

Figure 2:
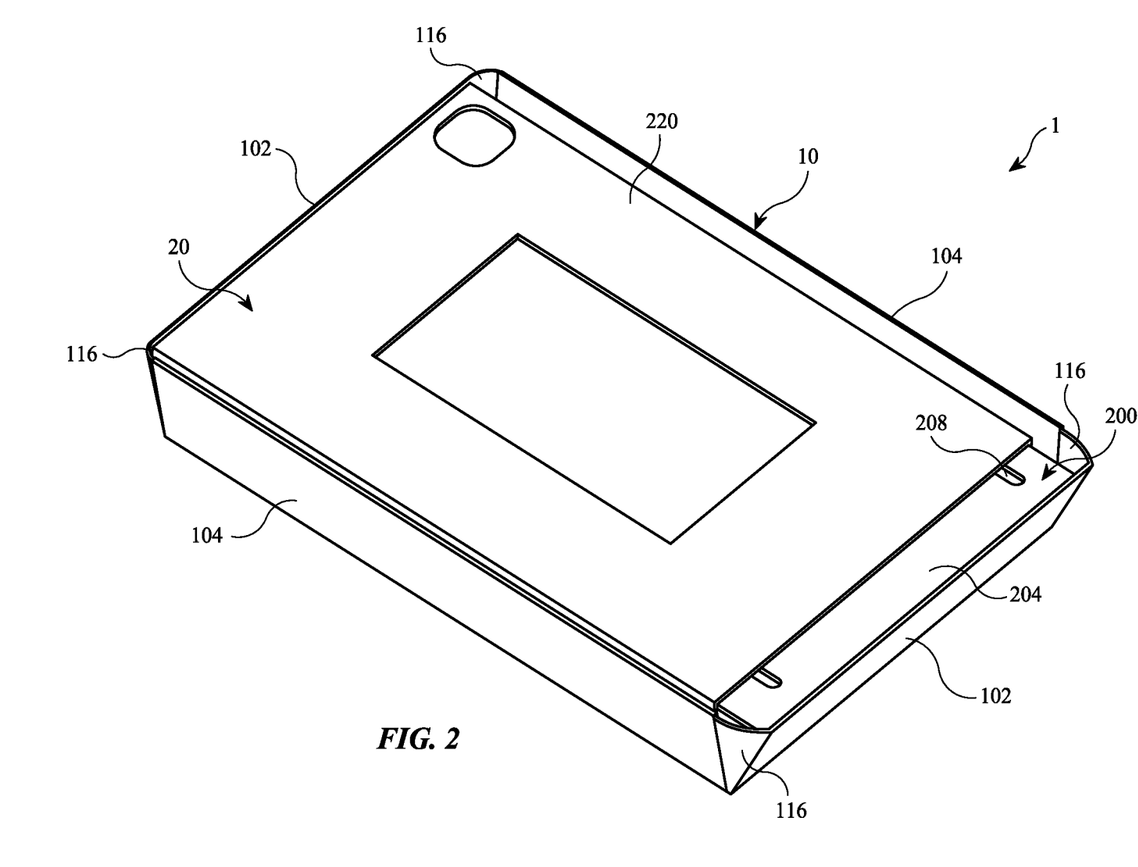
FIG. 2 shows a top isometric view of the packaging shown in FIG. 1 in a second, outwardly folded configuration.
Figure 3:
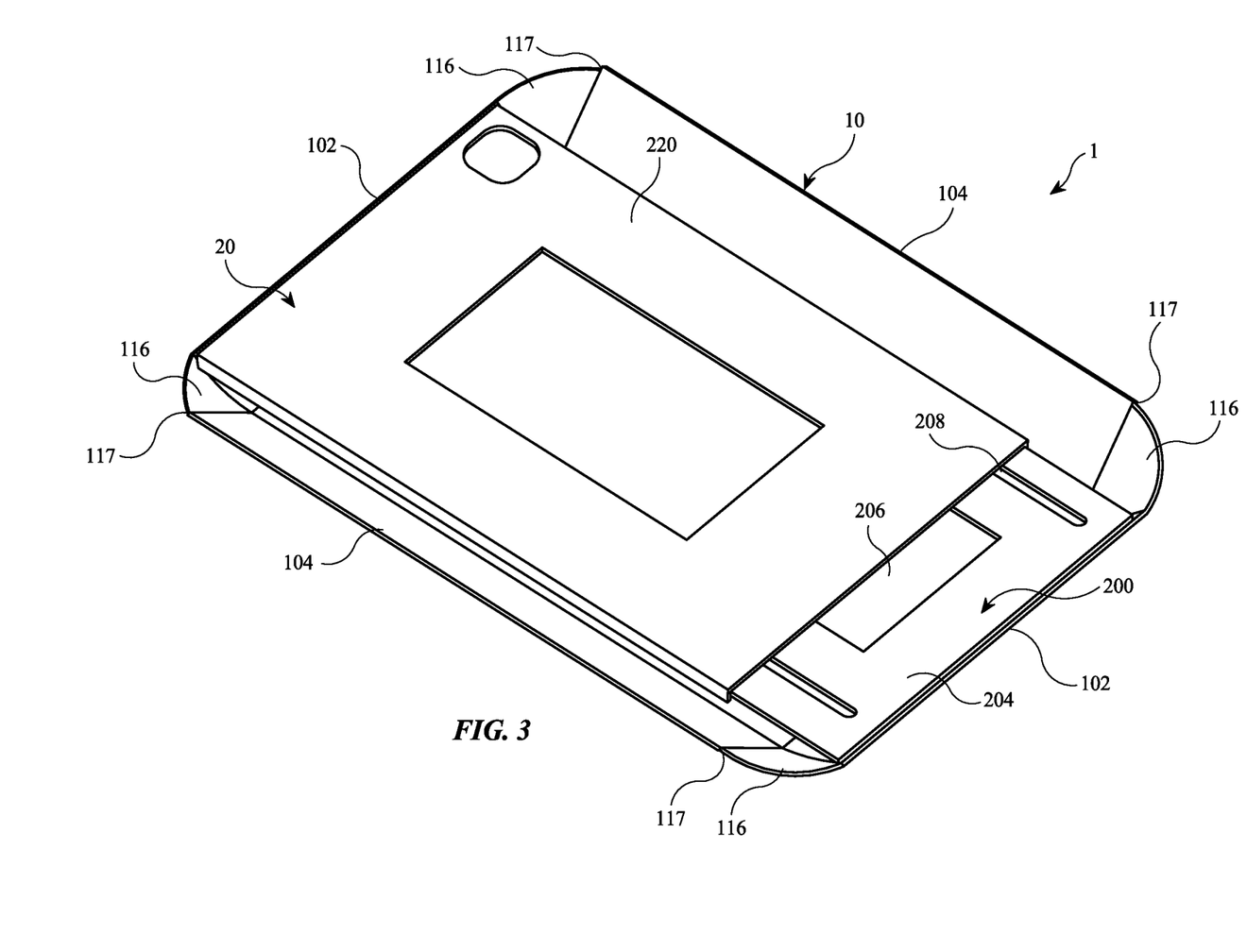
FIG. 3 shows a top isometric view of the packaging shown in FIG. 1 in a third, outwardly folded configuration.
Figure 4:
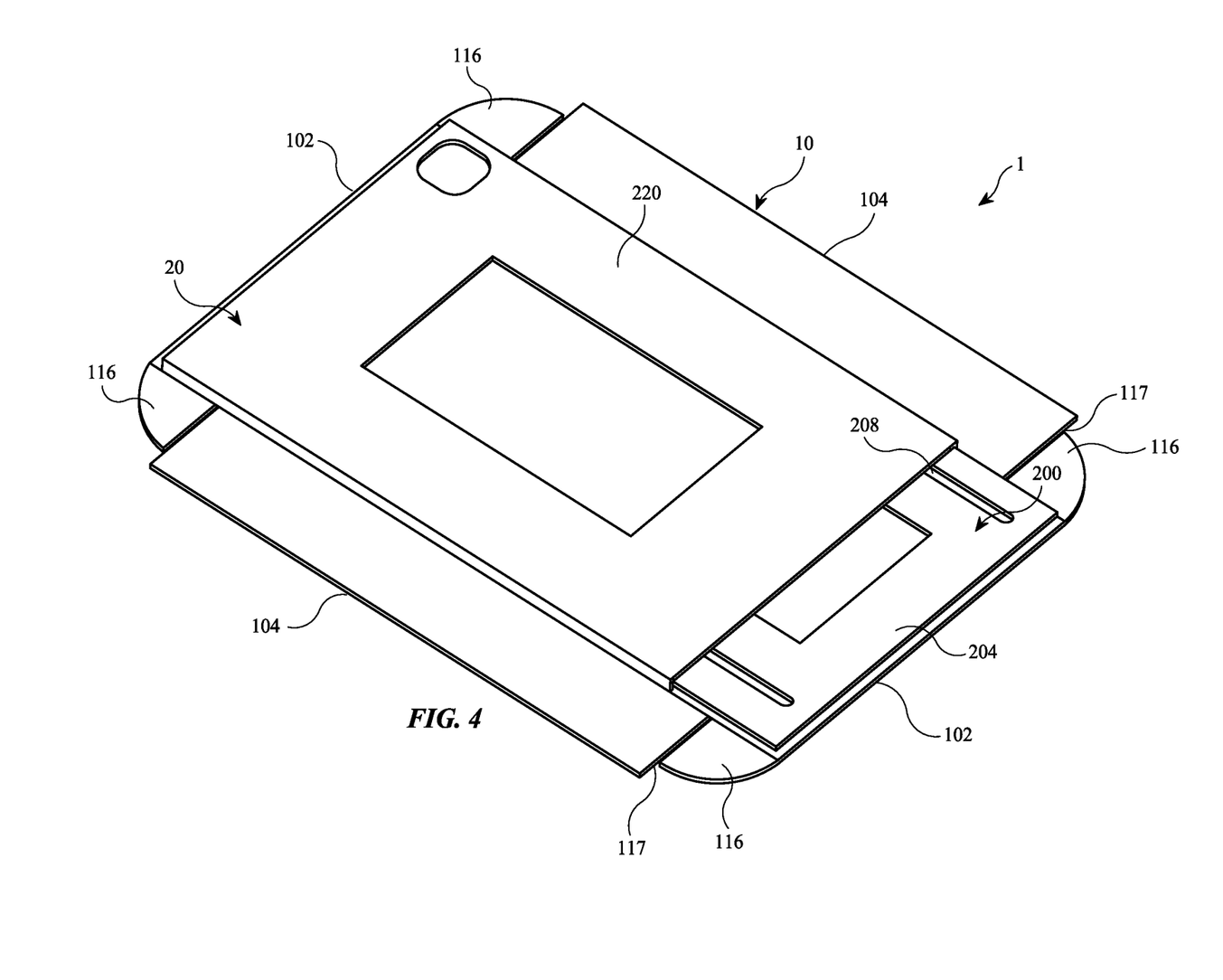
FIG. 4 shows a top isometric view of the packaging shown in FIG. 1 in a fourth, outwardly folded configuration.

As shown in FIG. 2, base box 10 may be pulled at side panels 102 or panels 104, such that the respective pairs of panels begin to rotate away from the opening of base box 10. As the panels fold away, tray cover 220 slides in one direction revealing track 208 and upper support panel 204 of tray support 200. As the panels further fold away as shown in FIG. 3, product support area 206 is revealed, which adds structural support under tray cover 220 in the finished configuration of FIG. 1. Wings 116 of base box 10 become more visible, and the box further begins to flatten. Turning to FIG. 4, the base box 10 and tray 20 are fully flattened, and thus ready for recycling. Wings 116 may slip out of the slots 117 formed in base box as described herein, or may be retained if it is desired to reverse the folding steps to reconstruct the packaging 1. Put another way, each side panel may be foldable outward from the base panel 100. Folding one of the side panels outward causes the tray 20 to lower toward the base panel 104 of the base box 10. The wings 116 couple adjacent ends of the four side panels, respectively. Each wing 116 is foldably attached to one of a pair of adjacent ends of the four side panels and is received within a pocket of the other of the pair of adjacent ends of the four side panels (further described herein).

Figure 5:
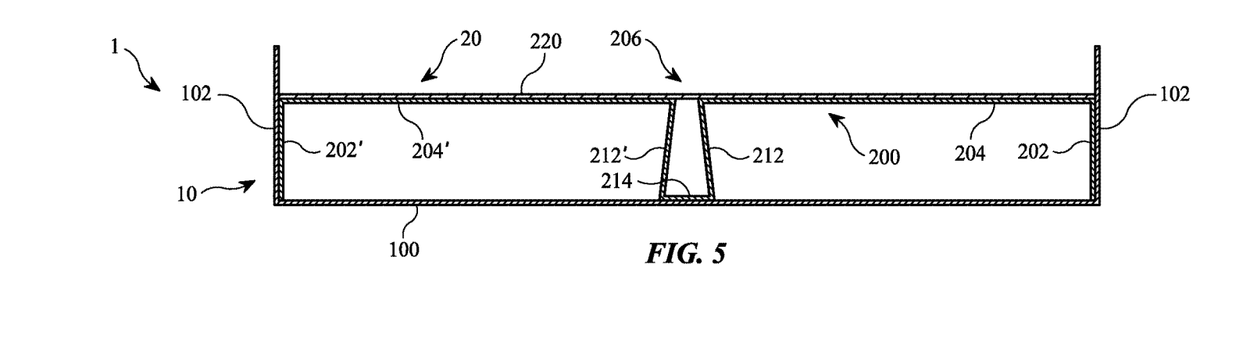
FIG. 5 shows a schematic cross section view of a tray and base box in a first configuration.
Figure 6:
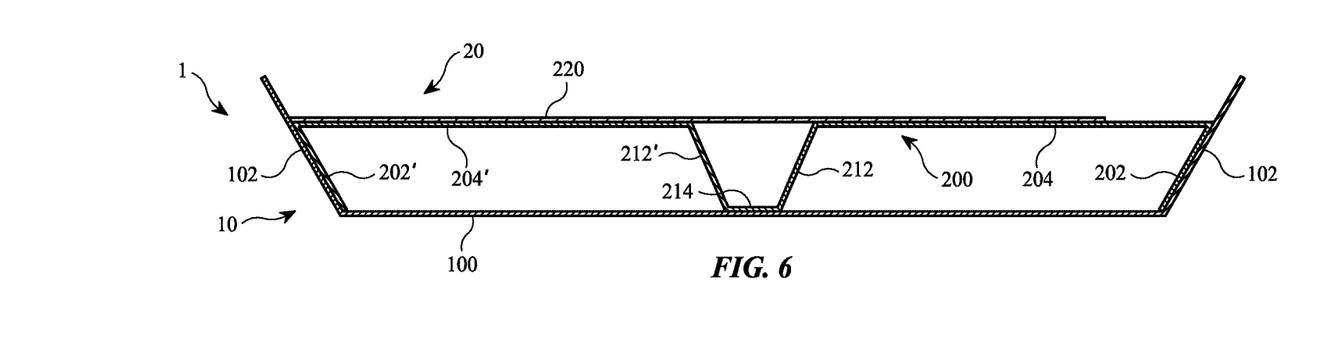
FIG. 6 shows a schematic cross section view of the tray and base box of FIG. 5 in a second configuration.
Figure 7:
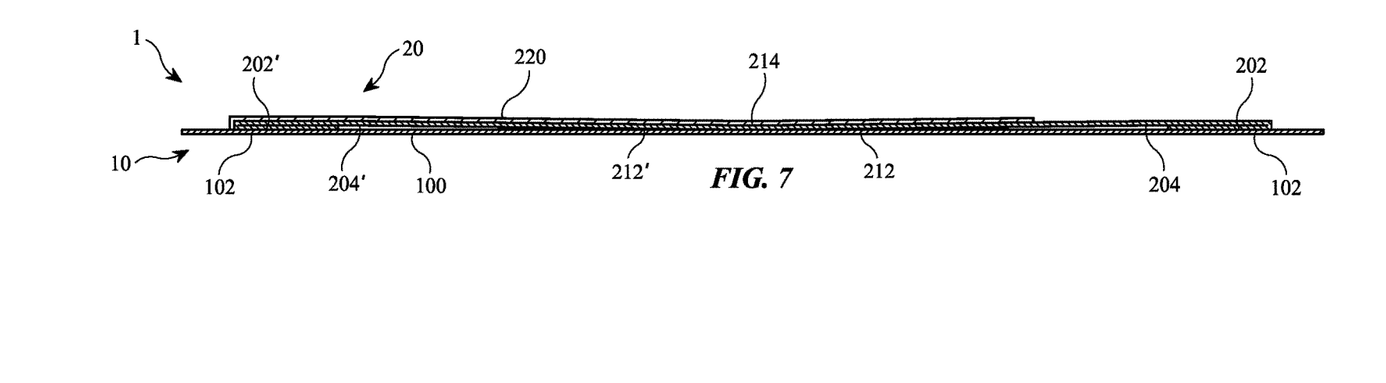
FIG. 7 shows a schematic cross section view of the tray and base box of FIG. 5 in a third configuration.

FIGS. 5-7 show a schematic cross section of components of base box 10 and components of tray 20 in three configurations, showing the internal structure that allows for the flattening of the tray. As further described below, support tray 200 provides additional structural support for tray 20 during use. Support tray 200 includes side panels 202 and 202', which may be adhered at an inner periphery of base box 10 (e.g., inner surfaces of panels 102, respectively). As shown, each of side panels 202/202' extend upward to a fold, whereby upper support panels 204/204' extend towards the center of support tray 200. Together, upper support panels 204/204' form a plane that tray cover 220 may be aligned on top of, and together form a product support area 206 that provides structural support for the product when packaging 1 is in an assembled state. In practice, tray cover 220 may be connected to the top surface of one of the upper support panels, e.g., support panel 204'. Because of the split configuration of the upper support panels 204/204', the tray is allowed to split and fold flat (as shown in the sequence of FIGS. 5-7), while maintaining a solid, unbroken appearance of tray cover 220 in an assembled configuration.

Towards the ends of upper support panels 204/204' opposite side panels 202 and 202', center support panels 212 and 212' extend downward to ground panel 214 which is coupled to the interior of base box 10 at bottom panel 100. Ground panel 214 may be adhered to the bottom panel 100 in some embodiments. FIG. 5 shows center support panels 212 and 212' extending upward and toward one another from ground panel 214. By fixing an initial angle towards the center of the support tray 200, sufficient distance is provided such that support tray 200 may fold fully flat in the flattened state (as shown in the flattened configuration of FIG. 7). This initial angle also provides structural support to the product support surface, in that a downward force (e.g., weight of product) would only tend to make the center support panels 212 and 212' move toward each other, maintaining their position and stability. If support panels 212 and 212' were angled away from each other a downward force might tend to make them move away from each other, toward premature collapse of the box.

Figure 8:
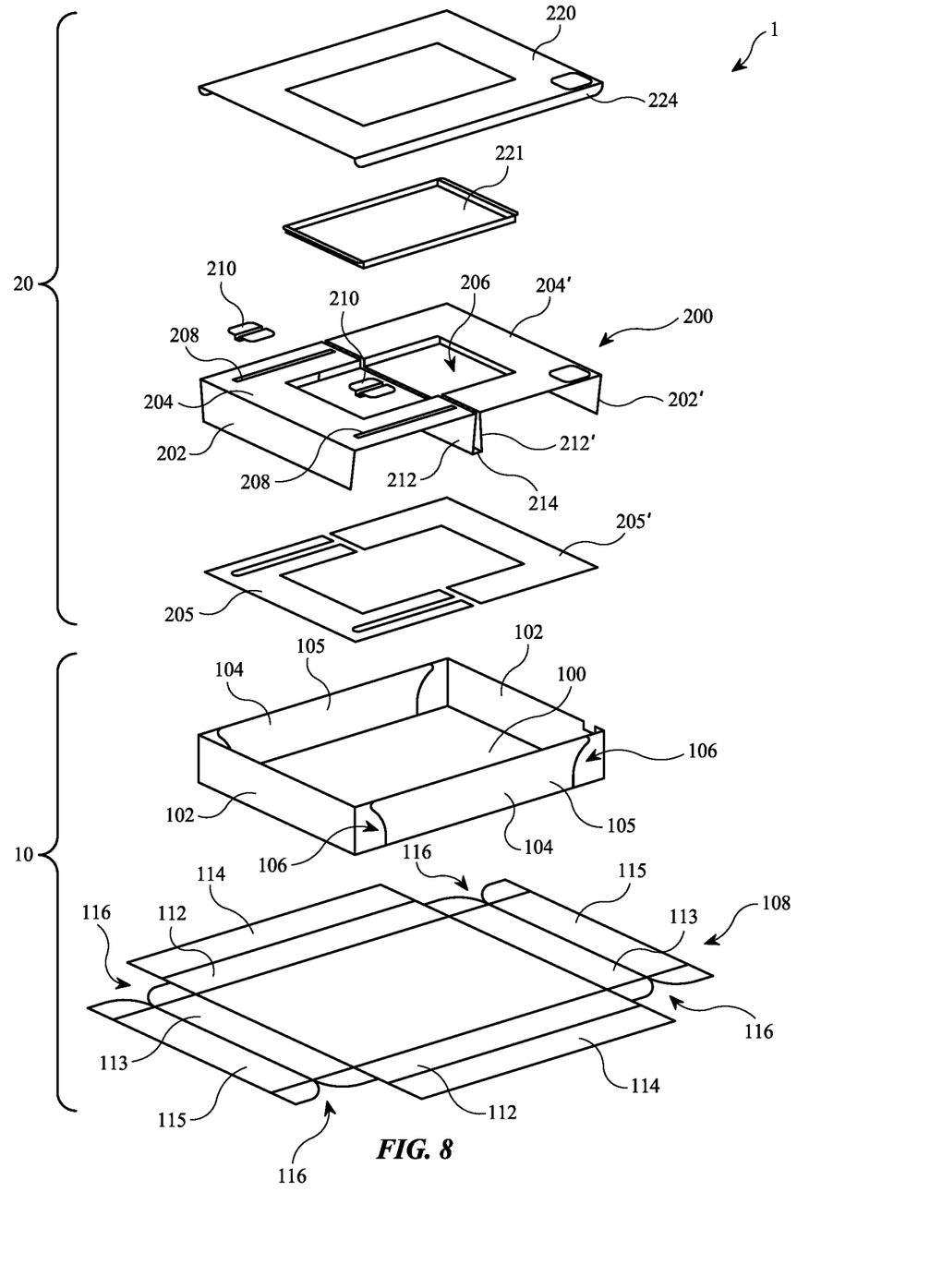
FIG. 8 shows an exploded view of a packaging with tray and base box in an embodiment.

Turning to FIG. 8, an exploded view of packaging 1 is shown, showing the components of tray 20 and base box 10. Tray cover 220 is shown and is configured to hide support tray 200. Product support area 221 may be inset within tray cover 220, or integrated within tray cover 220. In some embodiments, product support area 221 may be configured as a document pocket. Tray cover 220 may include panels 224 extending downward and further hiding edges of hidden components of tray 20 in use.

As described above, now referencing FIG. 8, support tray 200 is shown below tray cover 220, and provides additional structural support for tray 20 during use. Support tray 200 is connected to tray cover 220 on a first side of tray 20, e.g., at support panel 204'. On a second side of tray 20, e.g., the side of support panel 204, support tray 200 is connected to guides 210. Guides 210 in turn slide along slots 208 of support panel 204, e.g., when support tray 200 is folding outwardly away from its center, such that tray cover 220 maintains a planar orientation and translates relative to support panel 204 parallel to the axes of guides 210, when packaging 1 is being folded flat. Support shims 205 and 205' may be fixed to the bottom surface of support panels 204 and 204', respectively, and provide additional planar structural support to product support area 206. As shown, support shim 205 may include slots that match slots 208, so as to allow easy translation of guides 210 within slots 208. As shown in FIG. 8, support tray 200 may be formed from a continuous sheet (e.g., a cardboard blank). In some embodiments, support tray 200 may be formed from additional individual components, e.g., split support components.

Base box 10 may include bottom panel 100, with side panels 102 and panels 104 extending outward and foldable upward to provide for an interior cavity forming the opening of base box 10. As shown, panels 100, 102, and 104 may all be formed from a continuous sheet (e.g., a cardboard blank). Lower box cover 108 wraps around panels 100, 102, and 104, holding the assembled shape of base box 10. In some embodiments, lower box cover 108 may be made of a higher end finished paperboard, such that a separate material for panels 100, 102, and 104 may be hidden in use. In some embodiments, tray cover 220 may be made of a higher end finished paperboard, such as separate materials for the support tray 200. As can be appreciated from FIG. 8, panels 113 and 112, match to the outside surfaces of panels 102 and 104, respectively, when lower box cover is folded up into an assembled configuration. Panels 114 and 115 in turn fold over and match to the inside surfaces of panels 102 and 104, respectively. Wing guides 106 may be fixed to panels 104, and are configured to accommodate and aid in guiding wings 116 to be folded into a pocket 116 between panel 112 on the lower box cover 108 and side panel 104. In this configuration, with wings 116 received within pockets 117, it is clear that base box 10 is in an assembled state, and can receive tray 20 within it.

Figure 9:
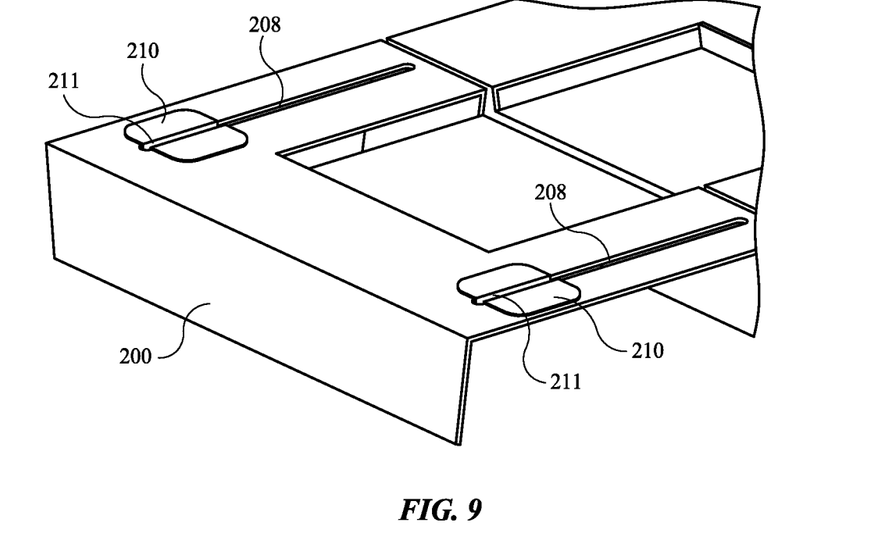
FIG. 9 shows a partial assembled view of tray and guide in an embodiment.
Figures 10, 11:
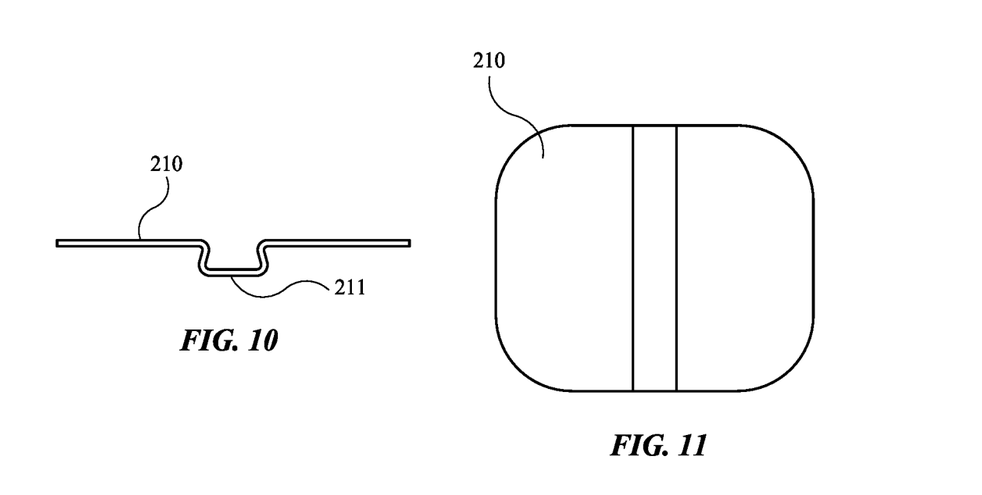
FIG. 10 shows a side view of the guide shown in FIG. 9.
FIG. 11 shows a top view of the guide shown in FIG. 9.

FIG. 9 shows an enlarged view of a portion of support tray 200, showing guides 210 having been inserted into slot 208. Also shown on the right side of the figure are guides 210 shown from the side and top, respectively. As shown, in some embodiments, guides 210 include a dovetail shaped fold 211 that may fix guides 210 in their respective slots 208. In assembly, this dovetail shaped fold 211 may be folded and angled through slot 208, and thereafter the top surfaces of guides 210 may be fixed to tray cover 220. As can be appreciated from the figures showing the flattening states of packaging 1, guides 210 may be placed towards an end of the slots 208 closest to the side panel 202, such that when they are attached to tray cover 220, the tray cover is free to translate away from that end and towards side panel 202' when the tray 20 is flattened. Each of guides 210 may be formed from a folded continuous sheet of recyclable material. Adhesive or non-adhesive based alternatives may be used to fix the top surfaces of guides 210 to tray cover 220. FIG. 10 shows a side view of guide 210, and FIG. 11 shows a top view of guide 210.

Figure 12:
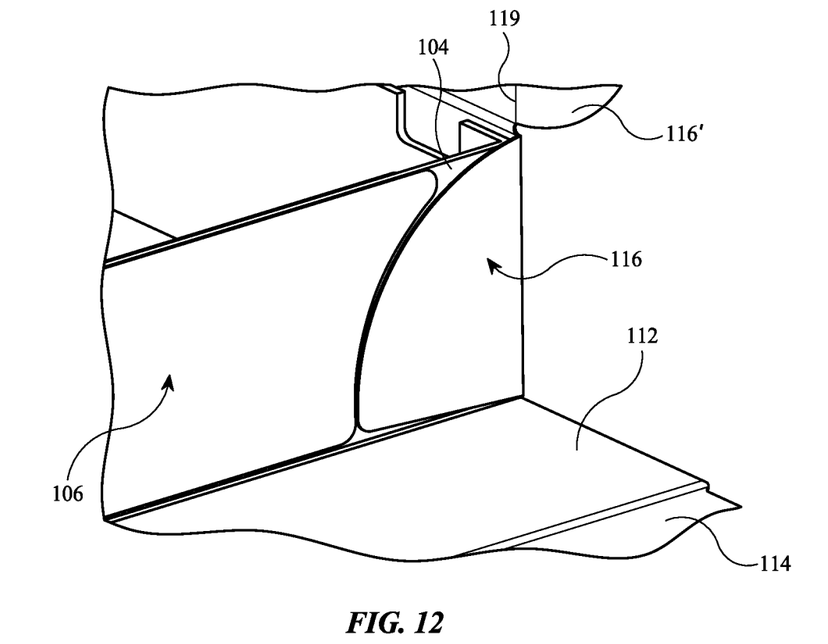
FIG. 12 shows a partial assembled view of a base box having a wing and wing guide in an embodiment.

FIG. 12 shows an enlarged view of a portion of base box 10 showing wing guide 106, coupled to panel 104. In some embodiments, wing guide 106 may be formed as a continuous sheet from panel 104, i.e., folded in on itself. Wing 116 is shown in an assembled position, with the wing contour following the wing guide contour along the surface of panel 104. As shown, panel 112 may fold up and create a pocket that encases wing 116 between panel 104 and panel 112 in an assembled state. The wing guides 106 may be formed as a panel, and may serve as a spacer to space panel 112 away from panel 104 to create the pocket 117. In some embodiments, to effect this a wing guide 106 is at least as thick as its corresponding wing 116. In some embodiments, a second wing 116' may be included, and may be folded towards the inside of box base box 10, such that fold line 119 corresponds to the corner of base box 10 shown in FIG. 12.

Figure 13:
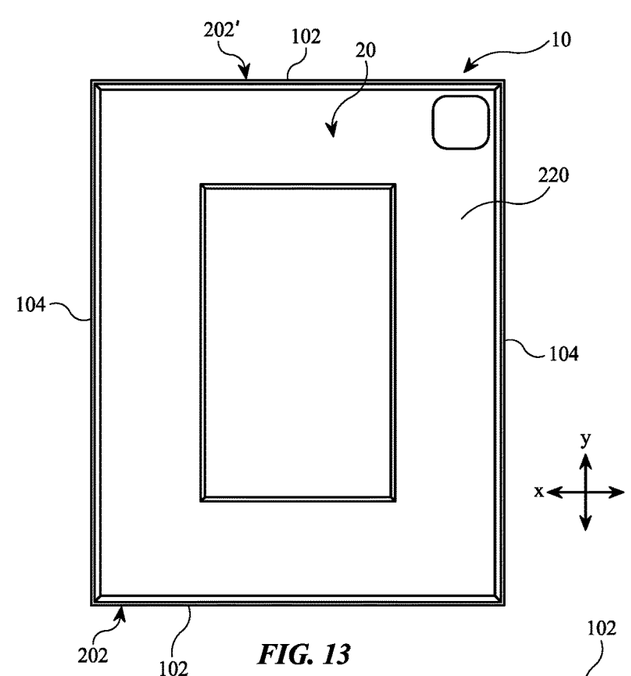
FIG. 13 shows an assembled state of packaging in an embodiment.
Figure 14:
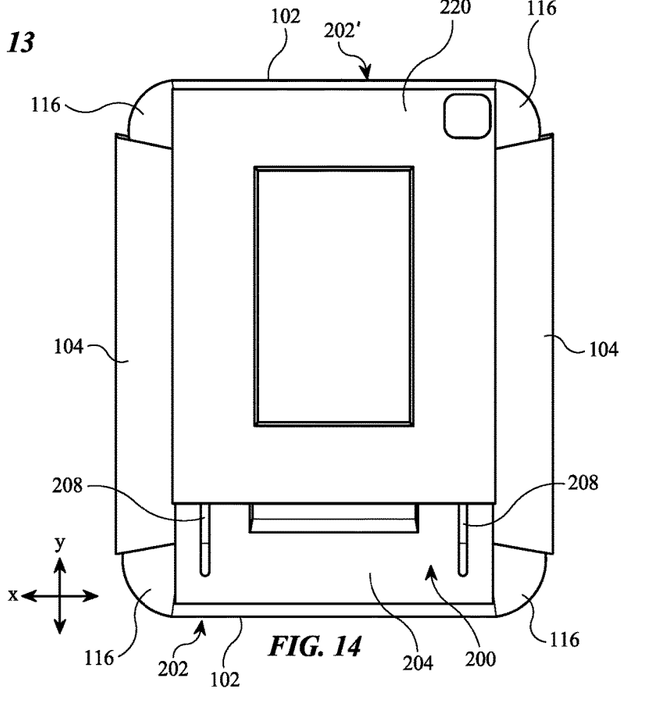
FIG. 14 shows a flattened state of the packaging shown in FIG. 13.

FIG. 13 shows an assembled state of packaging 1, and FIG. 14 shows a flattened state of packaging 1. As shown in the flattened state, tray 20 and side panels 102 of base box 10 generally flatten out in a first direction (y), while side panels 104 of base box 10 flatten in a second direction (x) generally perpendicular to the first direction. This provides additional structural stability in the assembled position, such that the packaging 1 does not involuntarily collapse outward and flatten without an applied force designed to flatten it. As shown in FIG. 13, in an assembled state, packaging 1 maintains a unitary appearance and shows virtually no gaps and seams in the construction. And in FIG. 14, even in a flattened state, there is no destructive damage to the packaging 1—simply it folds away tray 20 and base box 10 together. The folding away of the tray 20 and base box 10 may be simultaneous, such that side panels 202/202' are attached to the side panels 102 of box 10. In this way, the translational coupling between guides 210 and slots 208 allow base box 10 to flatten outwardly, while support tray 200 unfolds below tray cover 220. In some embodiments, the base box is configured to fold flat outwardly in a first direction, and the tray is configured to fold flat outwardly in a second direction, wherein the second direction is perpendicular to the first direction. In some embodiments, the base box folds flat in both the first direction and the second direction.

Figure 15:
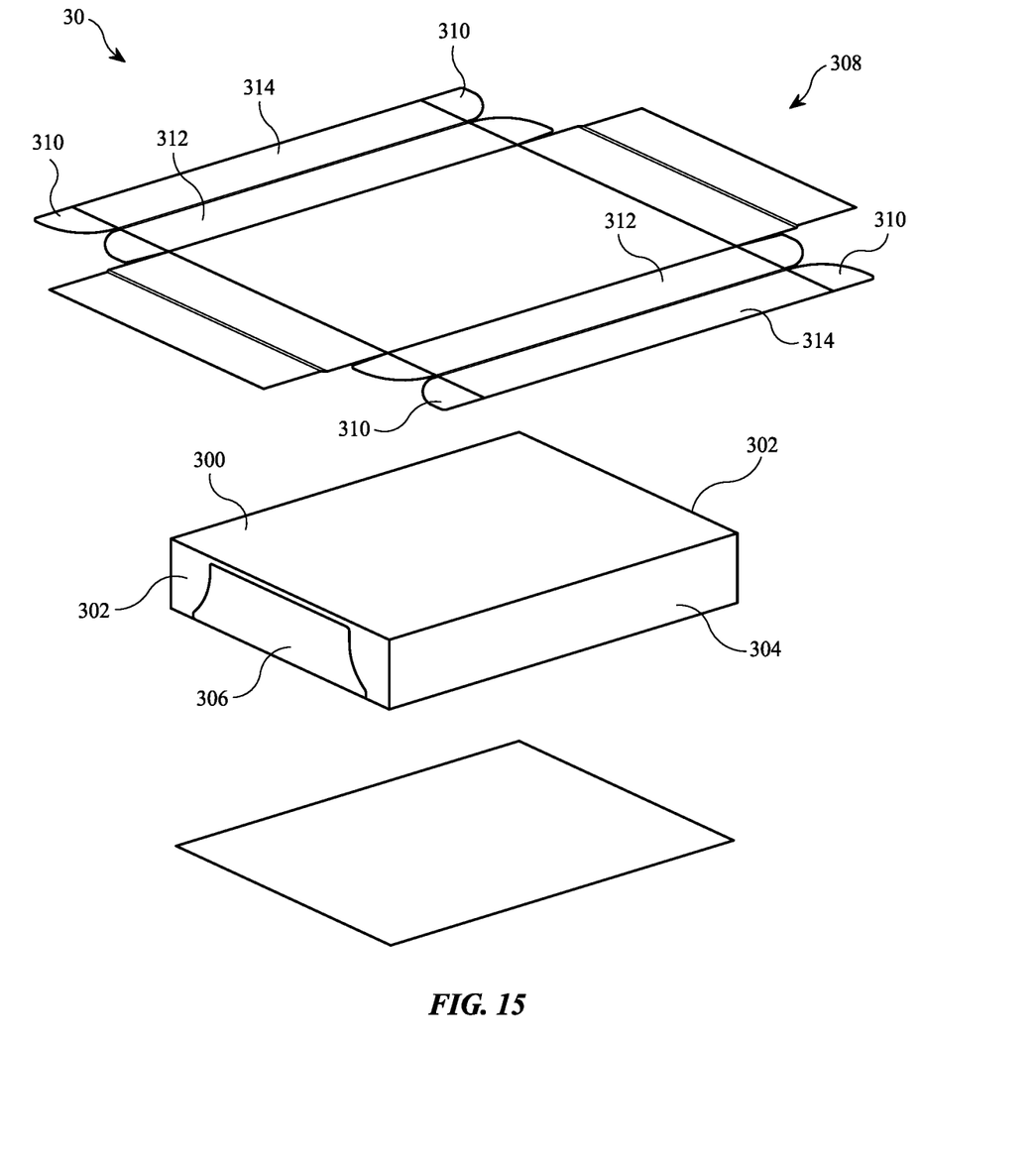
FIG. 15 shows an exploded view of a foldable lid in an embodiment.

FIG. 15 shows lid 30, which may be included in packaging 1, as a cover to base box 20. Lid 30 may be formed similarly to base box 20. Lid 30 may include top panel 300, with side panels 302 and panels 304 extending outward and foldable downward to provide for an interior cavity forming the opening of lid 30. In some embodiments, the lid includes foldable wings 310 to couple adjacent ends of the four lid side panels, respectively, and each wing 310 may be foldably attached to one of a pair of adjacent ends of the four lid side panels and is received within a pocket of the other of the pair of adjacent ends of the four lid side panels. In some embodiments, when the lid 30 is coupled to the base box 10, the pockets of the base box 10 are perpendicular to the pockets of the lid 30. For example, in a rectangular configuration (where the base and lid both have cooperating rectangular forms), wings may extend from panels forming the shorter sides of the base box, and wings may extend from panels forming the longer sides of the lid, or vice versa. In this way, additional structural support is provided in an assembled, closed configuration, in that the collapsing direction for the base box and lid are opposing and retain each other in an assembled state. Specifically, the lid panels that rotate outward first to remove the lid wings are the perpendicular to the base panels that rotate outward first to remove the base wings. As shown, panels 300, 302, and 304 may all be formed from a continuous sheet (e.g., a cardboard blank). Upper lid cover 308 wraps around panels 300, 302, and 304, holding the assembled shape of lid 30. As with lower box cover 108, in some embodiments, lid cover 308 may be made of a higher end finished paperboard, such that a separate material for panels 300, 302, and 304 may be hidden in use. As can be appreciated, panels 313 and 312 match to the outside surfaces of panels 302 and 304, respectively, when the lid cover is folded into an assembled configuration. Panels 314 and 315 in turn fold over and match to the inside surfaces of panels 302 and 304, respectively. Wing guides 306 may be fixed to panels 302 or 304, and are configured to accommodate and aid in guiding wings 310 to be folded into a pocket between panel 312 on the lid cover 308 and side panel 304.

Figure 16:
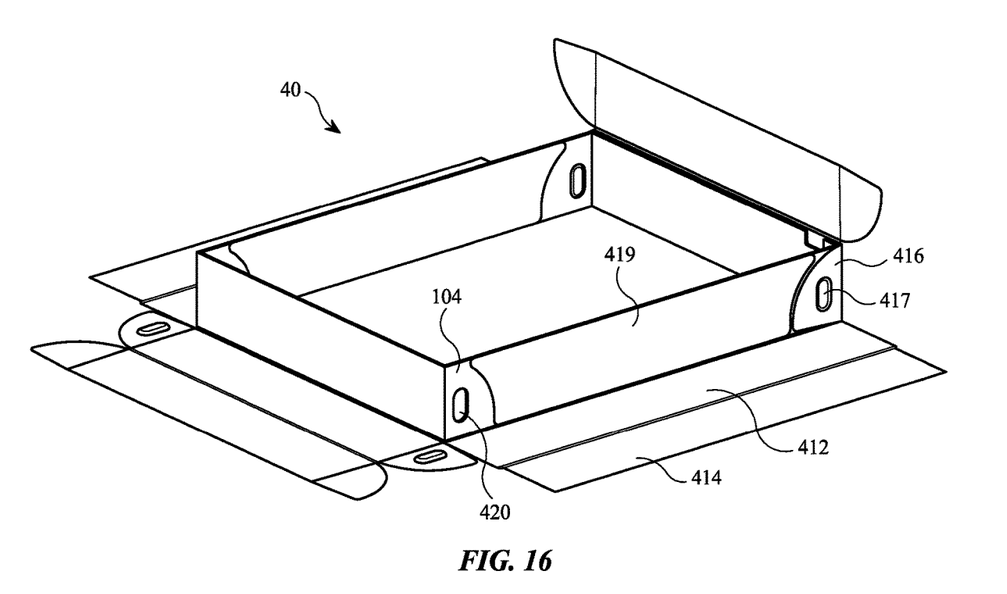
FIG. 16 shows a partial assembled view of a base box having a mechanical lock in an embodiment.

Finally, FIG. 16 shows an embodiment of base box 40, having a similar configuration as base box 10. Base box 40 may include bottom panel 400, with side panels 402 and panels 404 extending outward and foldable upward to provide for an interior cavity forming the opening of base box 40. In FIG. 16, it is shown that side panel 404 includes a retention element 420, formed as an aperture. Wing 416 includes a corresponding protrusion 417 that together form a mechanical lock, such that in order to begin the flattening of base box 40, a sufficient force to overcome such a lock must be applied. In this regard, a tactile or audible cue may be perceptible given a threshold force such that it indicates the function of the flattening state is intended to the end user. Additionally, these mechanical locks increase structural robustness, e.g., protecting against drop events or other shipping vibrations to maintain the packaging 1 in an aesthetic and structurally sound condition until the end consumer decides to dispose of the packaging 1. Alternative constraints may be applied, such that the wings are fixed in a particular orientation but free to deflect in response to a sufficient applied force.

Because the each of the components may be composed of recyclable cardboard that is a biodegradable or compostable material, if the other materials used are also similarly biodegradable or compostable, if and when the customer opts to dispose of the packaging, the packaging may simply be recycled without requiring material separation (e.g., in a single-stream recycling program). Advantageously, this improves upon prior systems having, for example, expanded polystyrene, foams, plastic inserts, or plastic film retention systems, which do not afford an environmentally friendly solution. The flattening aspect further improves upon other packaging systems that are not easily prepared for recycling without destructive force.

Components of packaging 1, such as base boxes 10/40, tray 20, and lid 30, may be formed from one or more cardboard blanks. In some embodiments, the blank is formed of a single continuous substrate, such as, for example cellulose-based material like cardboard corrugate. Other cellulose-based materials are contemplated, such as paperboard, certain molded fiber components of sufficient construction, or grayboard. Tabs, flaps, and regions without adhesive of the blank are folded such that no adhesive is visible in finished packaging 1. In some embodiments, adhesive may be omitted and the various flaps and tabs attached in another suitable manner (e.g., by mechanical interlock or press fit).

Each of the components and their constituent parts, and other variations described herein may include corresponding features described with reference to each of the other components and features described without limitation.

In some embodiments, any surface finishing may take place after the components are cut from the blank, or alternatively prior to the blank being cut into separate sheets for assembling to a final product. Additionally, some operations may be performed concurrently. All or some of the surfaces of the packaging may be coated, or laminated, which may increase structural strength properties such as rigidity and which may protect a product within the packaging, or avoid scratching.

Additionally, the packaging may be manufactured in a cost-effective and environmentally-friendly way. In some embodiments, the packaging components may be constructed of a single integrally-formed piece of material. The single integrally-formed piece of material may be a foldable material that is folded into a configuration that holds and secures a product, either alone or within a cavity of a packaging container. In some embodiments, the foldable material may be a single piece of material that is cut by a single operation (e.g., a single die-cutting operation). In some embodiments, the foldable material may be die cut from a stock material (e.g., a sheet of cardboard corrugate, or roll of material), or other fiber or cellulose based material. Single integrally-formed pieces of material that are cut by a single cutting operation may facilitate efficient and reproducible manufacturing. Moreover, such manufacturing may reduce waste by reducing waste material during manufacturing.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. Packaging, comprising:
   a base box comprising:
   a base panel; and
   four side panels, each extending vertically from the base panel, and each foldable outward from the base panel; and
   foldable wings to couple adjacent ends of the four side panels, respectively, wherein each wing is foldably attached to one of a pair of adjacent ends of the four side panels and is received within a pocket of the other of the pair of adjacent ends of the four side panels;
   a foldable tray received in the base box, wherein folding one of the side panels outward causes the foldable tray to lower toward the base panel of the base box; and
   a lid comprising:
   four lid side panels, each extending vertically from a lid top panel, and each foldable outward from the lid top panel; and
   foldable wings to couple adjacent ends of the four lid side panels, respectively, wherein each wing is foldably attached to one of a pair of adjacent ends of the four lid side panels and is received within a pocket of the other of the pair of adjacent ends of the four lid side panels, wherein when the lid is coupled to the base box, the pockets of the base box are perpendicular to the pockets of the lid.

2. The packaging of claim 1, wherein each of the base box and the foldable tray is formed from cardboard.

3. The packaging of claim 1, wherein the base box is configured to fold flat outwardly in a first direction, and the foldable tray is configured to fold flat outwardly in a second direction, wherein the second direction is perpendicular to the first direction.

4. Packaging, comprising:
   a base box transitionable between an assembled state and a flattened state comprising:
   a base panel;
   four side panels, each extending vertically from the base panel at respective folds when the box is in an assembled state, and each foldable outward from the base panel to configure the base box to a flattened state; and
   a tray configured to be received in the base box and transitionable between an assembled state and a flattened state, the tray comprising:
   a tray cover; and
   a tray support disposed beneath the tray cover and slidably connected to the tray cover, wherein the tray support structurally supports the tray cover in an assembled state and positions the tray cover above the base panel, wherein the tray support is foldable to a flattened state when the base box is in a flattened state,
   wherein in the assembled configuration a first side panel of the four side panels and a second side panel of the four side panels extend perpendicularly from the base panel and the tray cover is spaced apart from the base panel, and
   wherein when the first side panel and the second side panel are rotated outwardly about their folds, the tray cover and a portion of the tray support slide relative to each other and lower toward the base panel, to transition the base box into the flattened state.

5. The packaging of claim 4, wherein the tray support further comprises:
   first and second side panels configured to be fixed to an inner periphery of the base box;
   first and second upper support panels extending from the first and second side panels, respectively, and providing a product support area when the packaging is in an assembled state,
   wherein as an inner periphery of the base box folds outwardly to a flattened state the first and second side panels allow the first and second upper support panels to lower towards the base panel of the base box, thereby flattening the tray.

6. The packaging of claim 5, wherein the tray cover is fixed to the first upper support panel, such that as the first upper support panel lowers towards the base panel of the base box, the tray cover also lowers towards the base panel of the base box, and wherein the tray cover extends from a first of the four side panels to a second of the side panels opposite the first side panel when in an assembled state.

7. The packaging of claim 6, wherein the tray cover is translationally coupled to the second upper support panel, such that as the second upper support panel lowers towards the base panel of the base box, the tray cover also lowers towards the base panel of the base box and translates along the upper surface of the second upper support panel.

8. The packaging of claim 5, wherein the second upper support panel comprises a slot to receive a guide, wherein the guide is fixed to the lower surface of the tray cover.

9. The packaging of claim 8, wherein as the second upper support panel moves when folding the tray flat, the guide is free to translate within the slot, thereby also translating the tray cover along the slot.

10. The packaging of claim 4, wherein the base box, tray cover, and tray support are made from cardboard.

11. The packaging of claim 4, wherein the base box further comprises:
    wing guides; and
    a lower box cover folded around the base panel and side panels, the lower box cover including wings to be received in a pocket between a portion of the lower box cover and a side panel of the base box, guided by the wing guides, such that the base box is secured in an assembled state.

12. The packaging of claim 11, wherein each of the wings includes a mechanical lock configured to releasably attach to the base box.

13. The packaging of claim 11, further comprising a lid, the lid comprising:
    a lid top panel;
    four side panels, each extending vertically from the lid top panel at respective folds when the lid is in an assembled state, and each foldable outward from the lid top panel to configure the lid to a flattened state; and
    a lid cover folded around the lid top panel and side panels, the lid cover including wings to be received in a pocket between a portion of the lid top cover and a side panel of the lid, such that the lid is secured in an assembled state, and
    wherein the wings of the lid extend into the panels offset 90 degrees from the panels that the wings of the base box extend into, in an assembled state.

14. A foldable tray for packaging and configured to be coupled within a base box, comprising:
    a tray cover formed of a first cardboard material; and a tray support disposed beneath the tray cover and formed of a second cardboard material different from the first cardboard material, comprising:
    first and second side panels configured to be fixed to an inner periphery of a base box;
    first and second upper support panels extending from the first and second side panels and towards the center of the tray support;
    center support panels extending from the opposing ends of the first and second upper support panels towards a bottom surface of an interior of the base box; and
    a ground panel connecting the center support panels and coupled to the bottom surface of an interior of the base box,
    wherein in an assembled state the foldable tray supports a product,
    wherein the first and second side panels allow the first and second upper support panels to lower towards the ground panel, thereby flattening the tray in response to an outward force on the first and second side panels,
    wherein the tray cover is fixed to the first upper support panel, and
    wherein the tray cover is translationally coupled to the second upper support panel.

15. The foldable tray of claim 14, wherein in an assembled state the center support panels are angled toward each other relative to the ground panel, such that in a folded state the tray folds flat relative to the base box.

16. The foldable tray of claim 14, wherein the base box includes wings that fold inward and secure the side panels of the base box in the assembled state, and wherein the first side panel of the tray is fixed to an inner surface of a first side panel of the base box, such that as the first side panel of the base box rotates outward to the flattened state, the first side panel of the tray support rotates toward the base panel of the base box, thereby flattening a first side of the tray.

17. The foldable tray of claim 14, further comprising a lid, the lid comprising:
    a lid top panel;
    four side panels, each extending vertically from the lid top panel at respective folds when the lid is in an assembled state, and each foldable outward from the lid top panel to configure the lid to a flattened state; and
    foldable wings to couple adjacent ends of the four side panels, respectively, wherein each wing is foldably attached to one of a pair of adjacent ends of the four side panels and is received within a pocket of the other of the pair of adjacent ends of the four side panels, wherein in an assembled state, the wings secure the lid in a direction opposing the translational direction of the tray cover.

18. A foldable tray for packaging and configured to be coupled within a base box, comprising:
    a tray cover formed of a cardboard material; and
    a tray support disposed beneath the tray cover, comprising:
        first and second side panels configured to be fixed to an inner periphery of a base box;
        first and second upper support panels extending from the first and second side panels and towards the center of the tray support;
        center support panels extending from the opposing ends of the first and second upper support panels towards a bottom surface of an interior of the base box; and
        a ground panel connecting the center support panels and coupled to the bottom surface of an interior of the base box,
        wherein the first and second side panels allow the first and second upper support panels to lower towards the ground panel, thereby flattening the tray in response to an outward force on the first and second side panels,
        wherein the tray cover is fixed to the first upper support panel, and
        wherein the tray cover is translationally coupled to the second upper support panel.

\* \* \* \* \*